United States Patent
Honma et al.

(10) Patent No.: US 10,125,864 B2
(45) Date of Patent: Nov. 13, 2018

(54) LOCK-UP-CLUTCH CONTROL DEVICE

(71) Applicants: JATCO Ltd, Fuji-shi, Shizuoka (JP); NISSAN MOTOR CO., LTD., Yokohama-shi, Kanagawa (JP)

(72) Inventors: Tomoaki Honma, Isehara (JP); Kohei Kamiya, Yamato (JP); Yuta Suzuki, Sagamihara (JP); Itaru Shinohara, Atsugi (JP); Hiroshi Sekiya, Atsugi (JP); Hiromu Ogino, Yamato (JP); Yasuhiro Endo, Kanagawa (JP); Yuzuru Tohta, Kanagawa (JP); Kouki Saitou, Kanagawa (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 134 days.

(21) Appl. No.: 15/324,587

(22) PCT Filed: Jun. 22, 2015

(86) PCT No.: PCT/JP2015/067816
§ 371 (c)(1),
(2) Date: Jan. 6, 2017

(87) PCT Pub. No.: WO2016/006421
PCT Pub. Date: Jan. 14, 2016

(65) Prior Publication Data
US 2017/0204968 A1 Jul. 20, 2017

(30) Foreign Application Priority Data
Jul. 9, 2014 (JP) .................. 2014-141796

(51) Int. Cl.
*F16D 48/06* (2006.01)
*F16H 61/14* (2006.01)
*F16H 45/02* (2006.01)

(52) U.S. Cl.
CPC .......... *F16H 61/143* (2013.01); *F16D 48/06* (2013.01); *F16D 2500/1045* (2013.01);
(Continued)

(58) Field of Classification Search
CPC ... Y10T 477/635; Y10T 477/73; F16D 48/06; F16D 2500/70426; F16D 2500/3144;
(Continued)

(56) References Cited

U.S. PATENT DOCUMENTS 5,616,099 A 4/1997 Sakai
5,667,458 A * 9/1997 Narita .................. F16H 61/143
477/118

(Continued)

FOREIGN PATENT DOCUMENTS

EP 0 903 517 A2 3/1999
EP 1 739 329 A2 1/2007
JP 2008-008325 A 1/2008

*Primary Examiner* — Roger L Pang
(74) *Attorney, Agent, or Firm* — Foley & Lardner, LLP

(57) ABSTRACT

A control device for a lock-up-clutch installed in a torque converter arranged between an engine and an automatic transmission mechanism includes an engagement control means that carries out a calculation to increase an engaging capacity of the lock-up-clutch with the passage of time during an engagement control time in which the torque converter is shifted from a converter condition to a lock-up condition in which the prime mover drives an auxiliary device and in which when, during the control to increase the engaging capacity of the lock-up-clutch, an input torque to the torque converter from the engine is increased due to reduction in load of the auxiliary device, the engagement control means promotes the increase of the engaging capacity of the lock-up-clutch based on the amount of increase of the input torque thereby eliminating undesired pressure shortage that would be induced in the period toward the lock-up condition.

6 Claims, 6 Drawing Sheets

(52) U.S. Cl.
CPC .............. *F16D 2500/10412* (2013.01); *F16D 2500/30412* (2013.01); *F16D 2500/3144* (2013.01); *F16D 2500/7082* (2013.01); *F16D 2500/70426* (2013.01); *F16H 45/02* (2013.01); *F16H 2061/145* (2013.01); *Y10T 477/635* (2015.01); *Y10T 477/73* (2015.01)

(58) Field of Classification Search
CPC ... F16D 2500/30412; F16D 2500/1045; F16H 61/143; F16H 2061/145; F16H 45/02
See application file for complete search history.

(56) References Cited

U.S. PATENT DOCUMENTS

| | | | | |
|---|---|---|---|---|
| 5,674,155 | A * | 10/1997 | Otto .......................... | F16H 45/02 |
| | | | | 192/3.3 |
| 7,195,581 | B2 * | 3/2007 | Segawa ................. | F16H 61/143 |
| | | | | 477/180 |
| 7,510,505 | B2 * | 3/2009 | Kluemper ............. | F16H 61/143 |
| | | | | 477/168 |
| 9,422,880 | B2 * | 8/2016 | Phillips ................. | B60W 30/20 |
| 9,683,659 | B2 * | 6/2017 | Washio ................. | F16H 61/143 |
| 2003/0060330 | A1 * | 3/2003 | Sato ....................... | F16H 61/143 |
| | | | | 477/174 |
| 2005/0222738 | A1 | 10/2005 | Imamura et al. | |

* cited by examiner

LOCK-UP-CLUTCH CONTROL DEVICE

TECHNICAL FIELD

The present invention relates to a control device for a lock-up-clutch installed in a motor vehicle.

BACKGROUND ART

In motor vehicles, such as cars or the like, that have between an engine and an automatic transmission mechanism a torque converter, there is a type where the torque converter is equipped with a lock-up-clutch for reducing deterioration of fuel consumption which would be caused by a slippage of the torque converter. The lock-up-clutch has, as operation conditions, a lock-up condition wherein input and output elements are directly engaged, a converter condition wherein the input and output elements are fully disengaged to effect a torque transmission through a fluid, and a slip condition wherein the lock-up-clutch is made in a half-engagement condition to keep a given slip condition.

For controlling the lock-up-clutch, the above-mentioned three operation conditions are suitably switched in accordance with an operation condition of the vehicle, and the switching of the operation modes is carried out by varying a lock-up differential pressure [viz., differential pressure ($\Delta P$ (=Pa−Pr) between oil pressure Pa in an apply chamber and oil pressure Pr in a release chamber of the lock-up-clutch, in the following, the differential pressure will be referred to as a lock-up-clutch engaging pressure]. When the lock-up differential pressure $\Delta P$ is increased, the lock-up condition takes place, while, when the lock-up differential pressure $\Delta P$ is decreased, the converter condition takes place. When the lock-up differential pressure $\Delta P$ is between the above-mentioned increased value and the above-mentioned decreased value, the slip condition takes place.

In case of switching the operation condition from the converter condition to the lock-up condition, the pressure increasing is carried out under an open loop control until the pressure reaches the lock-up differential pressure, and thereafter, a slip control under a feed-back control is carried out to induce the lock-up condition. With this, the operation condition can be smoothly shifted to the lock-up condition. In the open loop control of this case, by periodically increasing a predetermined amount of change for increasing the engaging capacity of the lock-up-clutch, the lock-up-clutch engaging pressure is increased as the time elapses.

However, in case of using the control in which the predetermined amount of change is periodically increased to increase the fastening engaging capacity thereby to increase the lock-up-clutch engaging pressure, it is impossible to treat with a case wherein the engine torque is reduced due to closing of a throttle (or accelerator pedal) under the control. Accordingly, the clutch capacity becomes excessive and thus, an engagement shock, a rapid drop of engine rotation speed and the like tend to occur. For dealing with such undesirable phenomenon, there has been proposed a technology (Patent Document 1) in which during the period for engaging the lock-up-clutch, the engaging condition of the lock-up-clutch is controlled while setting, as the engaging capacity of the lock-up-clutch, a value that is provided by subtracting a slippage torque equivalent value of the torque converter from an estimated value of engine output torque inputted to the torque converter.

Although the invention disclosed by Patent Document 1 can cope with a case wherein the engine output is increased or decreased due to an accelerator operation induced by step-returning and increasing actions of the accelerator pedal by a driver, the disclosed invention can't cope with another case wherein the input torque for the torque converter is varied without the accelerator operation by the driver, that is, without change of the output torque itself of the engine.

For example, when an auxiliary device, such as a compressor for an air conditioner or the like that is driven by the engine, is shifted from an operation condition to a stopped condition, a part of the engine output torque that has driven the auxiliary device is added to the torque that is inputted to the torque converter, and thus, the input torque for the torque converter is increased without increase of the engine output torque. In the invention of Patent Document 1, the engaging condition of the lock-up-clutch is controlled based on the torque outputted from the engine, and thus, the technique disclosed by Patent Document 1 can't cope with the increase of the torque inputted to the torque converter. Accordingly, in case of the disclosed technique, undesired pressure shortage phenomenon that would be induced in a transition time for the lock-up condition can't be avoided.

Since rapid engaging of the lock-up-clutch gives the driver a large uncomfortable feeling, it is necessary to assuredly avoid such rapid engaging. Particularly, in case where the engine output torque is lowered upon the step-returning action of the accelerator pedal, the torque inputted to the torque converter is reduced and thus the pressure by which the lock-up-clutch is perfectly engaged is lowered, and thus, the clutch capacity becomes excessive thereby bringing about a rapid perfect engaging of the lock-up-clutch and appearance of the engagement shock and a rapid drop of the engine speed. It is necessary to assuredly eliminate such undesired engagement shock.

In the invention disclosed by Patent Document 1, the fastening condition of the lock-up-clutch is controlled based on an engine output torque that is calculated from a degree of the throttle opening appearing as the result of the step-returning action of the accelerator pedal, and thus, controlling the lock-up-clutch tends to produce a control delay due to a response delay of the hydraulic pressure used for the clutch fastening control. Accordingly, the undesired engagement shock tends to occur before the lock-up-clutch fastening pressure is lowered. It is necessary to assuredly eliminate such defects.

PRIOR ART DOCUMENTS

Patent Documents

Patent Document 1: Japanese Laid-open Patent Application (tokkai) 2006-162002

SUMMARY OF INVENTION

The present invention is provided by taking the above-mentioned tasks into consideration, and aims, as a first object, to provide, in a lock-up-clutch control device, a system by which undesired pressure shortage phenomenon that would be induced in a transition time for the lock-up condition is assuredly eliminated, and, as a second object, to provide a system by which undesired excessive clutch capacity phenomenon that would be based on the step-returning action of an accelerator pedal is assuredly eliminated.

(1) In order to achieve the objects, the present invention provides a control device for a lock-up-clutch installed in a torque converter arranged between a prime mover serving as a driving source and an automatic transmission mechanism, the control device including an engagement control means that carries out a calculation to increase an engaging capacity of the lock-up-clutch with the passage of time during an engagement control time in which the torque converter is shifted from a converter condition to a lock-up condition, the prime mover driving an auxiliary device, in which when, during the control to increase the engaging capacity of the lock-up-clutch, an input torque inputted to the torque converter from the prime mover is increased due to reduction in load of the auxiliary device, the engagement control means promotes the increase of the engaging capacity of the lock-up-clutch based on the amount of increase of the input torque.

(2) In the invention, it is preferable to prepare an input torque estimation means that estimates the input torque inputted to the torque converter from the prime mover; a torque increase judgment means that judges whether the input torque thus estimated by the input torque estimation means is increased or not; and an engaging capacity calculation means that calculates a command value for the engaging capacity of the lock-up-clutch at a predetermined calculation period, in which the engaging capacity calculation means includes a first calculation portion that calculates a current command value by adding a predetermined change amount to a previous command value so as to increase the engaging capacity of the lock-up-clutch with the passage of time and a second calculation portion that calculates, when increase of the input torque is judged by the torque increase judgment means, the current command value by adding, to the previous command value, both the predetermined change amount and a change amount based on the amount of increase of the input torque; and in which when increase of the input torque is judged based on a judgment result by the torque increase judgment means, the engagement control means controls the engaging capacity of the lock-up-clutch based on the current command value calculated by the second calculation portion, and when no increase of the input torque is judged based on the judgment result, the engagement control means controls the engaging capacity of the lock-up-clutch based on the current command value calculated by the first calculation portion.

(3) In the invention, it is preferable to prepare an accelerator open degree detecting means that detects an accelerator open degree of the motor vehicle; and an open degree reduction judgment means that judges whether the accelerator open degree detected by the accelerator open degree detecting means is decreased or not, in which the engaging capacity calculation means further includes a third calculation portion that, when reduction of the accelerator open degree is judged by the open degree reduction judgment means, calculates the current command value by subtracting a predetermined change amount from the previous command value; and in which when no reduction of the accelerator open degree is judged and no increase of the input torque is judged, the engagement control means controls the engaging capacity of the lock-up-clutch based on the current command value calculated by the first calculation portion, when no reduction of the accelerator open degree is judged and increase of the input torque is judged, the engagement control means controls the engaging capacity of the lock-up-clutch based on the current command value calculated by the second calculation portion and when reduction of the accelerator open degree is judged, the engagement control means controls the engaging capacity of the lock-up-clutch based on current command value calculated by the third calculation portion.

(4) In the invention, it is preferable to practically employ an idea in which the input torque estimation means estimates the input torque from the output torque of the prime mover and an auxiliary device drive torque applied from the prime mover to the auxiliary device.

(5) In the invention, it is preferable to practically employ an idea in which the auxiliary device includes a compressor employed in an air conditioner.

(6) The present invention provides another control device for a lock-up-clutch installed in a torque converter arranged between a prime mover serving as a driving source and an automatic transmission mechanism, the control device including an engaging capacity calculation means that carries out a calculation to increase an engaging capacity of the lock-up-clutch with the passage of time during an engagement control time in which the torque converter is shifted from a converter condition to a lock-up condition and an engagement control means that controls the engaging pressure of the lock-up-clutch based on the engaging capacity thus calculated, in which the control device further includes an accelerator open degree detecting means that detects an accelerator open degree of the motor vehicle an open degree reduction judgment means that judges whether the accelerator open degree detected by the accelerator is decreased or not; an input torque estimation means that estimates the input torque inputted to the torque converter from the prime mover; and a torque increase judgment means that judges whether the input torque thus estimated is increased or not, in which when reduction of the accelerator open degree is judged, the engaging capacity calculation means reduces the engaging capacity of the lock-up-clutch based on the amount of reduction of the open degree, and when no reduction of the accelerator open degree is judged and increase of the input torque is judged, the engaging capacity calculation means promotes the increase of the engaging capacity of the lock-up-clutch.

In the control device for a lock-up-clutch of the present invention, when, during the time for which the engaging capacity of the lock-up-clutch is controlled to be increased, the input torque inputted to the torque converter from the prime mover is increased, increasing the engaging capacity of the lock-up-clutch is promoted based on the amount of increase of the torque, so that in case of such torque increase, undesirable pressure shortage that would be produced in a period from the converter condition to the lock-up condition can be avoided.

Furthermore, when the accelerator open degree is reduced, a control by which the engaging capacity of the lock-up-clutch is reduced based on the amount of reduction of the open degree is carried out while taking priority over other controls, and thus, undesired clutch capacity excessiveness caused by a step-returning of the accelerator pedal can be assuredly avoided.

EMBODIMENT FOR CARRYING OUT INVENTION

In the following, an embodiment of the present invention will be described with reference to the attached drawings.

It is to be noted that the embodiment described in the following is only an example and elimination of application of various deformations and technologies, that are not clearly described in the following explanation, from the invention is not intended.

First, the construction of a driving system and a control system of a motor vehicle to which the lock-up-clutch control device of the embodiment is practically applied will be described. Although, in the embodiment, an example using, as an automatic transmission, a belt-type continuously variable transmission (which will be referred to as belt-type CVT or just CVT in the following) is used, the other type continuously variable transmissions, such as a toroidal CVT or the like and stepped automatic transmissions can be used.

[Overall System Construction]

Figure 1:
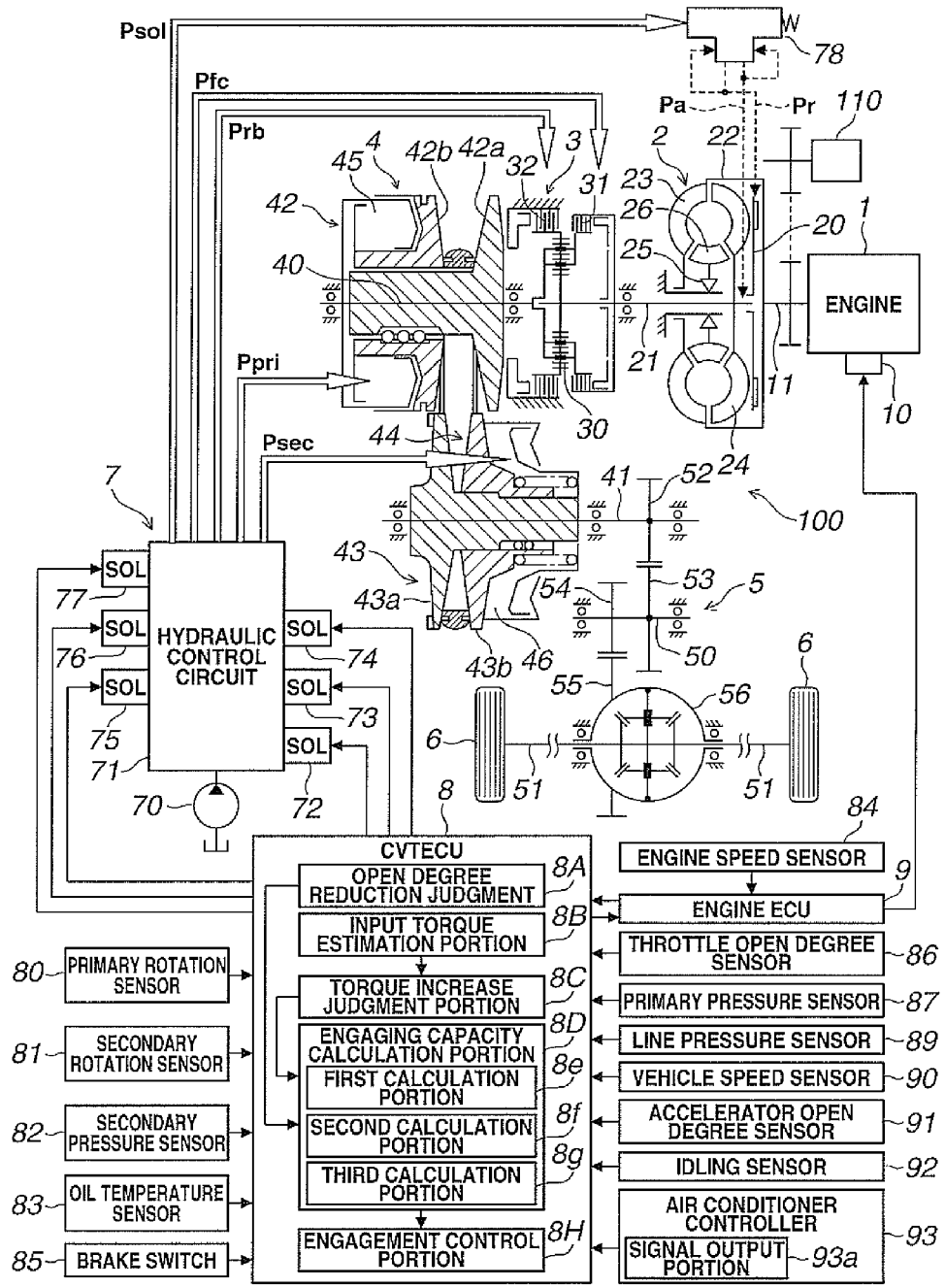
FIG. 1 is an overall construction view showing a driving system and a control system of a motor vehicle to which a control device of a lock-up-clutch, which is a first embodiment of the present invention, is practically applied.

FIG. 1 is a construction view showing a driving system and a control system of a motor vehicle to which the present embodiment is applied.

As is seen from FIG. 1, the driving system of the motor vehicle comprises an engine (prime mover, internal combustion engine) 1, a torque converter 2, a forward-rearward switching mechanism 3, a belt-type continuously variable transmission (automatic transmission) 4, a final speed reduction mechanism 5 and drive road wheels 6 and 6. The torque converter 2, the forward-rearward switching mechanism 3 and the belt-type continuously variable transmission 4 are installed in a transmission case to constitute a belt-type continuously variable transmission (CVT) 100.

The engine 1 is equipped with an output torque control actuator 10 for carrying out an output torque control in accordance with an open/close operation of a throttle valve and a fuel cut operation. With the output torque control actuator, the engine 1 is able to control its output torque in accordance with an engine control signal inputted from an external part, in addition to its output torque control based on an accelerator operation effected by a driver.

The torque converter 2 is a start element provided with a torque increasing function and equipped with a lock-up-clutch 20 that directly connects an engine output shaft 11 (=torque converter input shaft) with a torque converter output shaft 21 when the torque increasing function is not needed. The torque converter 2 employs, as its constituent elements, a pump impeller 23 that is connected to the engine output shaft 11 through a converter housing 22, a turbine runner 24 that is connected to a torque converter output shaft 21 and a stator 26 that is installed in a case through a one-way clutch 25.

In accordance with operation and driving conditions of the motor vehicle, the lock-up-clutch 20 is switchable to a lock-up condition (clutch fully engaged condition), an unlock-up condition (clutch fully disengaged condition) and a slip-lock-up condition (clutch slippable engaged condition) wherein a certain torque is transmitted from an input side to an output side while providing a difference between a rotation speed of a rotation member arranged in the input side of the lock-up-clutch and that of a rotation member arranged in the output side of the clutch.

The clutch condition switching control and the control of the clutch engaging force in the lock-up condition and the slippable engaged condition, that is, the control of the torque transmission capacity of the clutch are carried out by controlling the pressure of supply oil supplied to the lock-up-clutch 20. The supply oil pressure is a pressure difference appearing between two oil chambers arranged at front and rear positions of the lock-up-clutch 20, that is, a pressure difference (lock-up pressure difference) $\Delta P$ ($=Pa-Pr$) between a torque converter supply pressure Pa in an apply chamber and a torque converter releasing pressure Pr in a release chamber. For such control, the supply oil pressure is called also as a lock-up-clutch engaging pressure.

The forward-rearward switching mechanism 3 is a mechanism for switching the rotation direction of the torque inputted to the belt-type continuously variable transmission 4 between a normal direction needed for a forward running and a reverse direction needed for a rearward running. The forward-rearward switching mechanism 3 comprises a double pinion type planetary gear 30, a forward clutch 31 (forward side friction fastening element) including a plurality of clutch plates, and a reverse brake 32 (rearward side friction fastening element) including a plurality of brake plates.

When a forward run range, such as D-range (drive range) or the like is selected, forward clutch 31 becomes engaged by a forward clutch pressure Pfc. When R-range (reverse range) that is a reverse direction running range is selected, the reverse brake 32 becomes engaged by a reverse brake pressure Prb. When N-range (neutral range, non-running range) is selected, both the forward clutch 31 and reverse brake 32 are released due to draining of the forward clutch pressure Pfc and the reverse brake pressure Prb.

The belt-type continuously variable transmission 4 is equipped with a continuously variable transmission mechanism that continuously varies a transmission ratio between a transmission input rotation number and a transmission output rotation number by changing a belt contact diameter and comprises a primary pulley 42, a secondary pulley 43 and a belt 44. The primary pulley 42 includes a fixed pulley 42a and a slide pulley 42b, and the slide pulley 42b is movable in an axial direction by a primary pressure Ppri led to a primary pressure chamber 45. The secondary pulley 43 includes a fixed pulley 43a and a slide pulley 43b, and the slide pulley 43b is movable in an axial direction by a secondary pressure Psec led to a secondary pressure chamber 46.

Mutually facing surfaces or sheave surfaces of the fixed and slide pulleys 42a and 42b of the primary pulley 42 and mutually facing surfaces or sheave surfaces of the fixed and slide pulleys 43a and 43b of the secondary pulley 43 respectively form a V-shaped cross section, and flank surfaces on both sides of a belt 44 are in contact with the sheave surfaces. In accordance with an axial movement of the slide pulleys 42b and 43b, a belt-wound radius of each of the primary and secondary pulleys 42 and 43 is varied thereby to vary the transmission ratio.

The final speed reduction mechanism 5 is a mechanism that reduces a transmission output rotation from a transmission output shaft 41 of the belt-type continuously variable transmission 4 and transmits the speed reduced rotation to the left and right drive road wheels 6 and 6 while providing them with a differential function. The final speed reduction mechanism 5 is disposed between the transmission output shaft 41 and left and right drive shafts 51 and 51 and includes a first gear 52 mounted on the transmission output shaft 41, second and third gears 53 mounted on an idler shaft 50, a final reduction gear 55 and a differential gear 56 having the differential function.

Particularly, among control systems of the motor vehicle, the control system of CVT 100 is equipped with a hydraulic pressure control unit 7 and a CVT electronic control unit (CVT ECU) 8 as is seen from FIG. 1. Furthermore, there is employed an engine electronic control unit (Engine ECU) 9 that sends and receives information to and from the CVT electronic control unit 8. Each of the electronic control units (ECU: Electric Control Unit) 8 and 9 comprises input and output devices, a memory device (ROM, RAM, BURAM or the like) having various control programs installed therein, a central processing device (CPU) and a timer counter.

The hydraulic pressure control unit 7 is a control unit for producing a primary pressure Ppri led to the primary pressure chamber 45, a secondary pressure Psec led to the secondary pressure chamber 46, a forward clutch pressure Pfc led to forward clutch 31, a reverse brake pressure Prb led to the reverse brake 32, and a solenoid pressure Psol led to a lock-up control valve 78. The hydraulic pressure control unit 7 is equipped with an oil pump 70 and a hydraulic pressure control circuit 71, and the hydraulic pressure control circuit 71 is equipped with a line pressure solenoid 72, a primary pressure solenoid 73, a secondary pressure solenoid 74, a forward clutch pressure solenoid 75, a reverse brake pressure solenoid 76 and a lock-up solenoid 77.

In accordance with a line pressure indication outputted from the CVTECU 8, the line pressure solenoid 72 regulates the pressure of the operation fluid pneumatically fed from the oil pump 70 to an indicated line pressure PL.

In accordance with a primary pressure indication outputted from the CVTECU 8, the primary pressure solenoid 73 reduces and regulates the line pressure PL to an indicated primary pressure Ppri using the line pressure as a source pressure.

In accordance with a secondary pressure indication outputted from the CVTECU 8, the secondary pressure solenoid 74 reduces and regulates the line pressure PL to an indicated secondary pressure Psec using the line pressure as a source pressure.

In accordance with a forward clutch pressure indication outputted from the CVTECU 8, the forward clutch pressure solenoid 75 reduces and regulates the line pressure PL to an indicated forward clutch pressure Pfc using the line pressure as a source pressure.

In accordance with a reverse brake pressure indication outputted from the CVTECU 8, the reverse brake pressure solenoid 76 reduces and regulates the line pressure PL to an indicated reverse brake pressure Prb using the line pressure as a source pressure.

Upon receiving instruction from the CVTECU 8, the lock-up solenoid 77 produces the solenoid pressure Psol used as an indication signal pressure applied to the lock-up control valve 78. Upon receiving the solenoid pressure Psol as the indication signal pressure, the lock-up control valve 78 produces both the torque converter supply pressure and torque converter releasing pressure in such a manner that the pressure difference (lock-up pressure difference) ΔP (=Pa−Pr) between the front and rear oil chambers of the lock-up-clutch 20 shows a value based on the indication from the CVTECU 8.

The CVTECU 8 carries out a line pressure control that outputs instruction to the line pressure solenoid 72 for obtaining a target line pressure in accordance with a throttle open degree, etc., a speed change hydraulic pressure control that outputs instruction to both the primary pressure solenoid 73 and the secondary pressure solenoid 74 for obtaining a target transmission ratio in accordance with the vehicle speed, the throttle open degree, etc., a forward and rearward switching control that outputs instruction to both the forward clutch pressure solenoid 75 and reverse brake pressure solenoid 76 for controlling engaging/releasing of both the forward clutch 31 and reverse brake 32, and a control that outputs instruction to the lock-up solenoid 77 to control the engagement, releasing and slipping engagement (clutch slippable engaged condition) of the lock-up-clutch 20.

To the CVTECU 8, there are inputted sensor information and switch information outputted from a primary rotation sensor 80, a secondary rotation sensor 81, a secondary pressure sensor 82, an oil temperature sensor 83, an engine speed sensor 84, a brake switch 85, a throttle open degree sensor 86, a primary pressure sensor 87, a line pressure sensor 89, a vehicle speed sensor 90, an accelerator open degree sensor 91, an idling sensor 92, an air conditioner controller 93 and so on. From the engine ECU 9, there is inputted a torque information and to the engine 1, there is outputted a torque request. An inhibitor switch (not shown) detects a range position (D-range, N-range, R-range and so on) selected by a shift lever operation by a driver, and outputs a range position signal representing the selected range position.

[Construction of Lock-Up-Clutch Control Device]

The lock-up-clutch control device of the present embodiment features in that in a fastening control period during which the lock-up-clutch 20 is switched from the converter condition to the lock-up condition, calculation is so made as to increase a command value (which corresponds to a target value for controlling the engaging pressure) of the engaging capacity [which is called also as "clutch capacity"] of the lock-up-clutch 20 with the passage of time and the engaging pressure of the lock-up-clutch 20 is controlled based on the command value of the engaging capacity thus calculated.

That is, as the operation conditions of the lock-up-clutch 20, there are a lock-up condition (fully engaged condition) wherein input and output elements of the torque converter 2 are directly coupled, a converter condition wherein a torque transmission is made through a fluid while fully releasing the input and output elements and a slip condition wherein the lock-up-clutch 20 takes a half-engaged condition and the input and output elements keep a given slip condition therebetween.

For controlling the lock-up-clutch 20, the above-mentioned three operation conditions are suitably switched by varying the lock-up-clutch engaging pressure (=lock-up pressure difference). Particularly, in the engagement control, the command value $T_{LU}$ for the engaging capacity that represents the torque transmission capacity of the lock-up-clutch 20 (which is renamed just as engaging capacity $T_{LU}$ in the following) is periodically derived, and the command value $P_{LU}$ for the engaging pressure of the lock-up-clutch (which is renamed just as engaging pressure $P_{LU}$ in the following) is controlled in accordance with the engaging capacity $T_{LU}$ via an open loop control.

Between the engaging capacity $T_{LU}$ and the engaging pressure $P_{LU}$ of the lock-up-clutch 20, there is such a relation that the engaging pressure $P_{LU}$ increases as the engaging capacity $T_{LU}$ increases (for example, increases linearly), and thus, by preparing a map produced based on the relation, the engaging capacity $T_{LU}$ can be converted to the engaging pressure $P_{LU}$ with reference to the conversion map. Then, the engaging pressure $P_{LU}$ thus obtained is converted to a command value (lock-up duty) for the lock-up solenoid 77 to control the lock-up solenoid 77 based on the command value thereby to control the condition of the lock-up-clutch 20.

At the engagement control time when the lock-up-clutch 20 is switched from the converter condition to the lock-up condition, the engaging capacity $T_{LU}$ is increased with the passage of time causing the clutch to take the lock-up condition from the converter condition through the slip condition. However, when the lock-up (fully engaged coupling) of the lock-up-clutch 20 is sharply made, undesired engagement shock takes place inducing a poor riding comfort of the motor vehicle. Thus, at the time when the lock-up condition of the lock-up clutch 20 is intended, a control (smooth-on control) for smoothly increasing the torque transmission capacity to smoothly shift the clutch to the lock-up condition is carried out.

Figure 2:
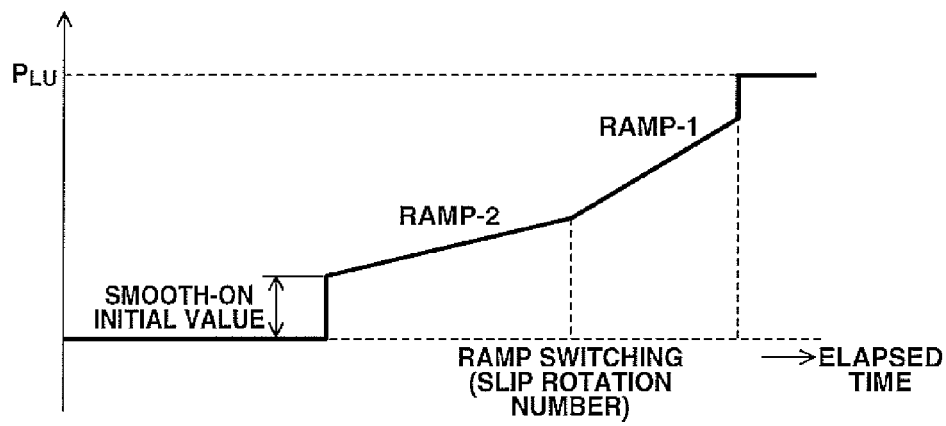
FIG. 2 is a time chart for explaining a basic control carried out by the control device of the lock-up-clutch of the first embodiment of the present invention.

In this smooth-on control, for the purpose of speedily completing the lock-up condition while suppressing the engagement shock, at first, as is understood from FIG. 2, the engaging pressure $P_{LU}$ is given an initial value (smooth-on initial value) forming a stepped increase in pressure, and thereafter, the pressure is increased in a ramp state. The smooth-on initial value is provided for making a clearance between clutches almost 0 (zero) (backlash suppression) by actuating the lock-up-clutch 20 under the converter condition toward the engagement side, and the smooth-on initial value is set to a value that appears when the lock-up-clutch 20 is in a state just before the slipping engagement.

During the time when the pressure increases in a ramp state (ramp control), a ramp-2 pressure is increased with a relatively small increasing rate is carried out and thereafter a ramp-1 pressure increase with a relatively large increasing rate is carried out. Due to the quite gentle increase of the engaging pressure $P_{LU}$ by the ramp-2, the movement of the lock-up-clutch 20 toward the engagement side is ballasted and approaching the time when the actual engaging pressure shows the engaging pressure $P_{LU}$ as indicated is waited. When, thereafter, the rotation speed difference (slip rotation speed) $\Delta N$ between the input and output elements of the torque converter 2 becomes equal to or smaller than a first predetermined value $\Delta N1$, the pressure increase is switched to the ramp-1, so that with the ramp-1 the engaging pressure $P_{LU}$ is increased with a suitable increasing rate that doesn't require an excessive time for the engagement and is able to avoid the sharp engagement. The rotation speed difference between the input and output elements of the torque converter 2, that is, the slip rotation speed $\Delta N$ corresponds to a difference (=Ne−Nt) between the engine rotation speed Ne and the turbine rotation speed Nt of the torque converter 2.

By the above-mentioned ramp control (ramp-2 and ramp-1), when the rotation speed difference (slip rotation speed) between the input and output elements of the torque converter 2 becomes equal to or smaller than a small engagement judging reference value (second predetermined value) that is near 0 (zero), the engaging pressure $P_{LU}$ is increased in a stepped manner judging that switching from the slip condition to the lock-up condition has been completed thereby to assuredly hold the lock-up condition. It is however to be noted that the judgment for the lock-up condition is carried out after a filtering operation for subjecting the calculated slip rotation speed $\Delta N$ to a noise cancelling is made.

The time when the lock-up-clutch 20 changes its condition from the slip condition to the lock-up condition is the time when the torque capacity (engaging capacity) $T_{LU}$ transmitted by the lock-up clutch 20 exceeds an input torque Tcin inputted to the torque converter 2 (and thus, lock-up-clutch 20), and thus, the condition changing time depends on the input torque Tcin. That is, even when, under the slip condition, the engaging capacity $T_{LU}$ of the lock-up-clutch 20 is not increased, lowering of the input torque Tcin induces the switching to the lock-up condition, and even when the engaging capacity $T_{LU}$ of the lock-up-clutch 20 is increased, the lock-up condition is not easily achieved if the input torque Tcin is increased.

Even when the ramp control is carried out, rapid reduction of the input torque Tcin brings about a rapid engagement of the lock-up-clutch 20 causing undesired movement of the motor vehicle. It is impossible to avoid the undesired movement of the motor vehicle by the above-mentioned ramp control using an open loop control. In order to avoid the rapid engagement of the lock-up-clutch 20 caused by the reduction of the input torque Tcin, it is necessary to provide or consider the influence caused by the rapid reduction of the input torque Tcin for the calculation of the engaging capacity $T_{LU}$.

When, under the ramp control, the input torque Tcin is increased, switching to the lock-up condition is not easily carried out and thus switching to the lock-up condition needs an excessive time. Since such phenomenon lowers a fuel consumption reducing effect, it is necessary to avoid such phenomenon. Furthermore, not only does excessive time take for switching to the lock-up condition, but also judder (abnormal vibration) tends to occur in the motor vehicle caused by the above-mentioned phenomenon in the transient state between the lock-up condition and the slip condition. Thus, it is necessary to avoid such phenomenon.

Although the input torque Tcin fed to the lock-up-clutch 20 depends on the output torque Te of the engine 1, the output torque Te of the engine 1 is fed not only to the torque converter 2 (CVT100) but also to an auxiliary device 110 driven by the engine 1, and thus, smoothed switching to the lock-up condition is not easily obtained if the input torque Tcin is not grasped by taking the above fact into consideration.

The lock-up-clutch control device of the invention is constructed to have sensors such as the lock-up-clutch 20, the throttle open degree sensor 86, the accelerator open degree sensor 91 and a signal output portion 93*a* that outputs signals representing an auxiliary device operation information and an open degree reduction judgment portion (open degree reduction judgment means) 8A provided as a function element of the CVTECU 8, an input torque estimation portion (input torque estimation means) 8B, a torque increase judgment portion (torque increase judgment means) 8C, an engaging capacity calculation portion (engaging capacity calculation means) 8D and an engagement control portion (engagement control means) 8H. By the engagement control portion 8H, such a control as to, during the above-mentioned ramp control by which the engaging capacity $T_{LU}$ is increased with the passage of time, avoid the rapid engagement of the lock-up-clutch 20 and establish a speedy switching to the lock-up condition is carried out.

In the present embodiment, the control for avoiding the rapid engagement is carried out during the time when the smooth-on control for increasing the engaging pressure $P_{LU}$ by the ramp-1 and ramp-2 is carried out. That is, in a period from the time when the engaging pressure $P_{LU}$ of the lock-up-clutch 20 is increased in a stepped manner to the time when the rotation speed difference ΔN becomes equal to or smaller than an engagement judgment reference value ΔNO, an accelerator step-returning control is carried out for avoiding the rapid engagement caused by the accelerator step-returning action. Furthermore, in the present embodiment, a control for effecting an earlier switching is carried out during the period for which the engaging pressure $P_{LU}$ is increased in the ramp-1 of the smooth-on control. That is, in the period from the time when, upon taking the slip condition by the lock-up-clutch 20, the rotation speed difference ΔN between the input and output elements of the torque converter 2 becomes equal to or smaller than the first predetermined value ΔN1 to the time when the rotation speed difference ΔN becomes equal to or smaller than the engagement judgment reference value ΔNO, an input torque increase control is carried out for preventing judder caused by the increase of the input torque and promoting the earlier switching.

The open degree reduction judgment portion 8A reads at a predetermined control period (calculation period) an accelerator open degree APO detected by the accelerator open degree sensor 91 for judging whether the accelerator open degree APO has lowered or not. In this step, an accelerator open degree change amount ΔAPO [=APO(n)–APO(n−1)] that is the difference between a current value APO(n) of the accelerator open degree and a previous value APO(n−1) is compared with a threshold value ΔAPO1 (but, ΔAPO1<0), and when the accelerator open degree change amount ΔAPO is smaller than the threshold value ΔAPO1 (viz., ΔAPO<ΔAPO1), judgment is so made that the accelerator open degree APO has lowered.

The input torque estimation portion 8B estimates at a predetermined control period an input torque Tcin that is inputted to the torque converter 2 from the engine 1. As is mentioned hereinabove, the output torque Te from the engine 1 is fed to not only the torque converter 2 but also the auxiliary device 110 driven by the engine 1. Thus, the input torque estimation portion 8B estimates the input torque Tcin considering the operation condition of the auxiliary device 110. Although, in the present embodiment, a compressor of an air conditioner is considered as the auxiliary device 110, the auxiliary device is not limited to the compressor.

Figure 3:
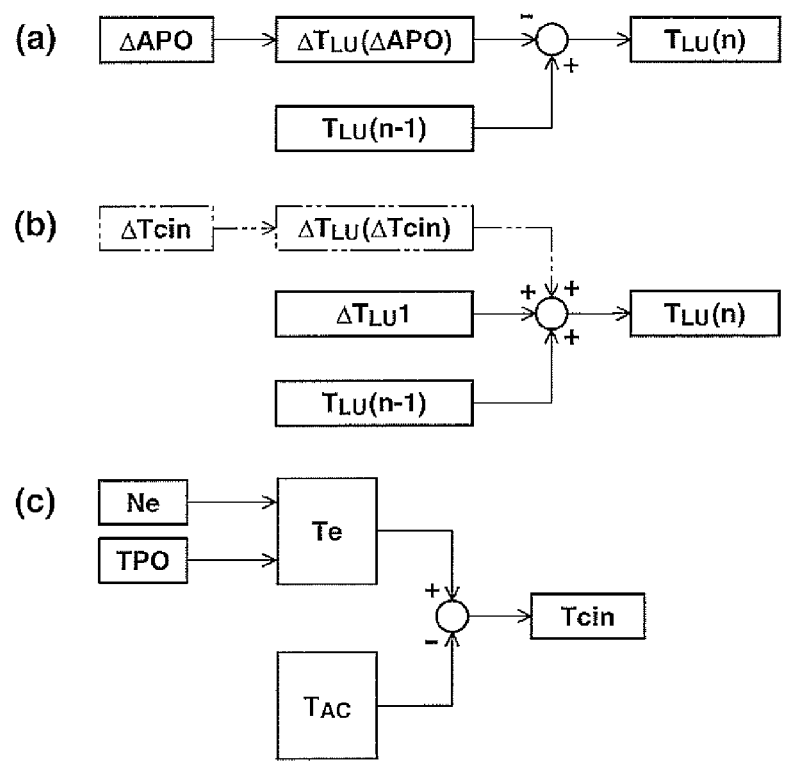
FIG. 3 shows block diagrams explaining calculations used for deriving the engaging capacity of the lock-up-clutch in the lock-up-clutch control device of the first embodiment of the present invention, wherein (a) shows a calculation for deriving the engaging capacity at the time when a step-returning control of the accelerator is carried out, (b) shows a calculation for deriving the engaging capacity at the time when an input torque increasing control and a normal control are carried out, and (c) shows a calculation for deriving an input torque used for calculating the engaging capacity.

That is, as is shown by FIG. 3(c), from the engine speed (engine rotation speed) Ne and the throttle open degree TPO, the input torque estimation portion 8B calculates an output torque Te of the engine at that point by using a known method disclosed in for example Patent Document 1. In addition to this, by considering the operation condition of the auxiliary device (compressor of the air conditioner) 110, part (auxiliary device driving torque) $T_{AC}$ of the engine output torque Te that is fed to the auxiliary device 110 is calculated. The operation condition of the auxiliary device 110 is grasped by checking a signal from a signal output portion 93a of the air conditioner controller 93. The auxiliary device driving torque $T_{AC}$ corresponds to the operation condition of the auxiliary device 110. The input torque estimation portion 8B calculates the input torque Tcin by subtracting the auxiliary device driving torque $T_{AC}$ from the engine output torque Te.

The torque increase judgment portion 8C judges if the input torque Tcin estimated at the input torque estimation portion 8B is increasing or not. That is, after reading the input torque Tcin at a predetermined control period, the torque increase judgment portion 8C compares an input torque change amount ΔTcin [=Tcin(n)–Tcin(n−1)], which is a difference between a current value Tcin(n) of the input torque Tcn and a previous value Tcin(n−1), with a threshold value ΔTcin1 (but, ΔTcin1>0), and if the input torque change amount ΔTcin is larger than the threshold value ΔTcin1, judgment is so made that the input torque Tcin has increased.

The engaging capacity calculation portion 8D includes a first calculation portion (normal time engaging capacity calculation portion) 8e that calculates a normal time engaging capacity, a second calculation portion (torque increase time engaging capacity calculation portion) 8f that calculates a torque increase time engaging capacity, and a third calculation portion (accelerator open degree reduction time engaging capacity calculation portion) 8g, and each calculation portion 8e to 8g carries out the calculation at a predetermined control period (calculation period).

The first calculation portion 83 calculates the normal time engaging capacity that is used when the input torque Tcin is in the normal condition. As is shown by a solid line in FIG. 3(b), in the first calculation portion 8e, there is carried out a calculation by which for each control period, the present engaging capacity $T_{LU}(n)$ is calculated by adding, to the previous engaging capacity $T_{LU}(n-1)$, a predetermined change amount (fixed amount) $\Delta T_{LU}1$ (but, $\Delta T_{LU}1>0$). The engaging capacity $T_{LU}(n)$ thus obtained is the normal time engaging capacity, and when this normal time engaging capacity is used, the engaging capacity $T_{LU}(n)$ increases with the passage of time at a constant increasing rate.

The second calculation portion 8f calculates a torque increase time engaging capacity that is used when the input torque Tcin is increasing. As is seen from the solid line and two-dot chain line of FIG. 3(b), in the second calculation portion 8f, there is carried out a calculation by which for each control period, the present engaging capacity $T_{LU}(n)$ is calculated by adding, to the previous engaging capacity $T_{LU}(n-1)$, a predetermined change amount (fixed amount) $\Delta T_{LU}1$ (but, $\Delta T_{LU}1>0$) as well as an engaging capacity change amount $\Delta T_{LU}1$ (ΔTcin) for correction based on an increased part ΔTcin of the input torque Tcin. The engaging capacity $T_{LU}(n)$ thus obtained is the torque increase time engaging capacity, and when this torque engaging time engaging capacity is used, the engaging capacity $T_{LU}(n)$ increases with the passage of time at an increasing rate that is larger than the rate of the normal time engaging capacity.

The third calculation portion 8g calculates an accelerator open degree reduction time engaging capacity that is used when the accelerator open degree is reducing. In this third calculation portion 8g, as is seen from FIG. 3(a), there is carried out a calculation by which for each control period, the present engaging capacity $T_{LU}(n)$ is calculated by subtracting, from the previous engaging capacity $T_{LU}(n-1)$, an engaging capacity change amount $\Delta T_{LU}$ (ΔAPO) based on an open degree reduction part ΔAPO (but, ΔAPO<0) of the accelerator open degree APO. The engaging capacity $T_{LU}(n)$ thus obtained is the accelerator pedal open degree reduction time engaging capacity, and when this accelerator pedal open degree reduction time engaging capacity is used, the engaging capacity $T_{LU}(n)$ decreases with the passage of time.

In the engaging capacity calculation portion 8D, there are carried out an operation in which when, based on the judging results at the open degree reduction judgment portion 9A and torque increase judgment portion 8C, the judgment is so made that the accelerator open degree APO is not reduced and the input torque Tcin is not increased, the normal time engaging capacity calculated by the first calculation portion 8e is used, an operation in which when the judgment is so made that the accelerator open degree APO is not reduced and the input torque Tcin is increased, the torque increase time engaging capacity calculated by the second calculation portion 8f is used and an operation in which when the judgment is so made that the accelerator open degree APO is reduced, the accelerator open degree reduction time engaging capacity calculated by the third calculation portion 8g is used.

The engagement control portion 8H controls the engaging pressure $P_{LU}$ of the lock-up-clutch 20 based on the engaging capacity $T_{LU}$ calculated by the engaging capacity calculation portion 8D. That is to say, in the engagement control portion 8H, there are carried out an operation in which when the judgment is so made that the accelerator open degree APO is not reduced and the input torque Tcin is not increased, the engaging capacity of the lock-up-clutch 20 is controlled based on the normal time engaging capacity of the command value calculated by the first calculation portion 8e, an operation in which when the judgment is so made that the accelerator open degree APO is not reduced and the input torque Tcin is increased, the engaging capacity of the lock-up-clutch is controlled based on the torque increase time engaging capacity of the command value calculated by the second calculation portion 8f, an operation in which when the judgment is so made that the accelerator open degree APO is reduced, the engaging capacity of the lock-up-clutch is controlled based on the accelerator open degree reduction time engaging capacity of the command value calculated by the third calculation portion 8g. In such cases, in the engagement control portion 8H, the engaging capacity $T_{LU}$ is converted to the engaging pressure $P_{LU}$ with reference to a not-shown converting map. Then, the engaging pressure $P_{LU}$ thus obtained is converted to a command value (lock-up duty) for the lock-up-solenoid 77, the lock-up solenoid 77 is controlled according to the command value thereby to control the condition of the lock-up-clutch 20.

[Operation and Effect]

Figure 4:
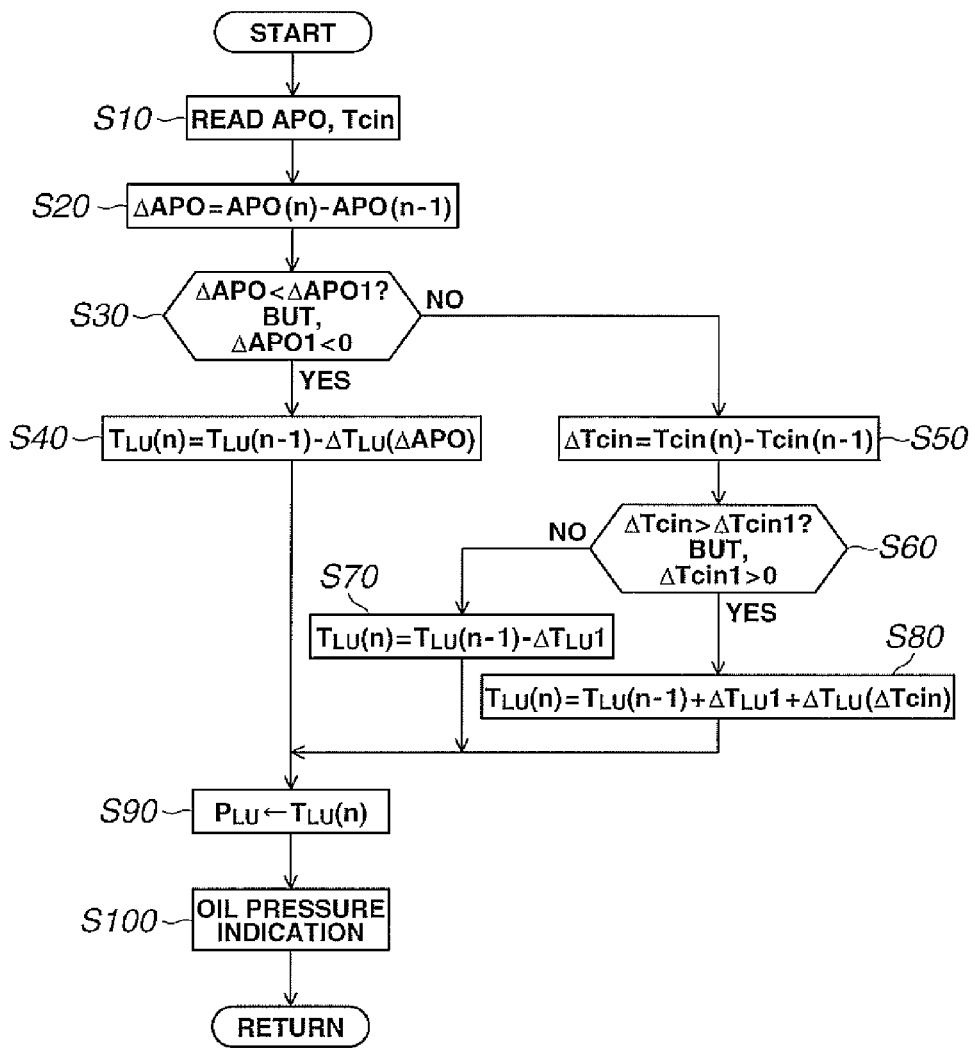
FIG. 4 is a flowchart that shows the control of the lock-up-clutch control device of the first embodiment of the present invention.

Since the lock-up-clutch control device of the present embodiment has the above-mentioned construction, the lock-up-clutch 20 can be controlled in such a manner as is seen from the flowchart of FIG. 4. It is to be noted that the operation shown by the flowchart of FIG. 4 is carried out in an engagement control period (viz., the time when the smooth-on control is kept and $\Delta N0 \leq \Delta N \leq N1$ is kept) through which the lock-up-clutch 20 is switched from the converter condition to the lock-up condition, and this operation is repeated at a given control period until the engagement control is completed. An initial value $T_{LU}(1)$ of the engaging capacity is previously set to a value that corresponds to an initial value (smooth-on initial value) of the engaging pressure $P_{LU}$.

As is seen from FIG. 4, the CVTECU 8 reads both the accelerator open degree APO detected by the accelerator open degree sensor 91 and an input torque Tcin estimated by the input torque estimation portion 8B (step S10). Then, an accelerator open degree change amount $\Delta APO$ [=APO(n)−APO(n−1)] that is a difference between a present value APO(n) and a previous value APO(n−1) of the accelerator open degree is calculated (step S20).

Then, by comparing, in the open degree reduction judgment portion 8A, the accelerator open degree change amount $\Delta APO$ with a threshold value $\Delta APO1$ (but, $\Delta APO1 < 0$), judgment is carried out as to whether the accelerator open degree APO has reduced or not (step S30). When the accelerator open degree change amount $\Delta APO$ is smaller than the threshold value $\Delta APO1$, it is judged that the accelerator open degree APO has reduced.

When reduction of the accelerator open degree APO is judged, the engaging capacity calculation portion 8D carries out, at the third calculation portion 8g, a calculation through which the present engaging capacity $T_{LU}(n)$ is calculated by subtracting, from the previous engaging capacity $T_{LU}(n-1)$, an engaging capacity change amount $\Delta T_{LU}(\Delta APO1)$ based on the open degree reduction part $\Delta APO$ (but, $\Delta APO < 0$) of the accelerator open degree APO (step S40). The engaging capacity $T_{LU}(n)$ (viz., accelerator open degree reduction time engaging capacity) is reduced with the passage of time. Then, the operation goes to step S90.

While, if, in the open degree reduction judgment portion 8A, it is judged that the accelerator open degree APO has not reduced, a change amount $\Delta Tcin$ of the input torque Tcin that is estimated in the input torque estimation portion 8B and inputted to the torque converter 2 is calculated (step S50), and in the torque increase judgment portion 8C, judgment is carried out as to whether the input torque Tcin has increased or not based on the input torque change amount $\Delta Tcin$ (step S60).

When at the torque increase judgment portion 8C it is judged that the input torque Tcin has not increased, in the first calculation portion 8e, there is carried out a calculation for deriving the present engaging capacity $T_{LU}(n)$ by adding, to the previous engaging capacity $T_{LU}(n-1)$, a predetermined change amount (fixed amount) $\Delta T_{LU}1$ (but, $\Delta T_{LU}1 > 0$) (step S70). The engaging capacity $T_{LU}(n)$ (normal time engaging capacity) thus obtained increases with the passage of time at a constant increasing rate. Then, the operation goes to step S90.

When increase of the input torque Tcin is judged at the torque increase judgment portion 8C, the first calculation portion 8e calculates the present engaging capacity $T_{LU}(n)$ by adding, to the previous engaging capacity $T_{LU}(n-1)$, a predetermined change amount (fixed amount) $\Delta T_{LU}1$ (but, $\Delta T_{LU}1 > 0$) as well as the engaging capacity change amount $\Delta T_{LU}(\Delta Tcin)$ based on the increase part $\Delta Tcin$ of the input torque Tcin (step S80). The engaging capacity $T_{LU}(n)$ (torque increase time engaging capacity) thus obtained increases with the passage of time at an increasing rate that is larger than that of the normal time engaging capacity. Then, the operation goes to step S90.

The case where the torque increase judgment portion 8C judges the increase of the input torque Tcin is for example a case where the output torque Te of the engine 1 is increased due to an additional stepping of the accelerator pedal and/or a case where the auxiliary device 110 such as the compressor of an air condition is switched from an operation condition to a stopped condition. In case where the accelerator open degree is kept after the addition stepping of the accelerator pedal and/or the auxiliary device 110 is kept off after its stopping, step S60 judges that the input torque Tcin has not increased and then step S70 calculates the present engaging capacity $T_{LU}(n)$ by adding the predetermined change amount $\Delta T_{LU}1$ to the previous engaging capacity $T_{LU}1(n-1)$.

After the engaging capacity $T_{LU}(n)$ for the accelerator open degree reduction time engaging capacity, the normal time engaging capacity and the torque increase time engaging capacity is calculated at either one of steps S40, S70 and S80, the engaging capacity $T_{LU}$ is converted to the engaging pressure $P_{LU}$ by the engagement control portion 8H (step S90), and the engaging pressure $P_{LU}$ thus obtained is converted to a command value (lock-up duty) of the lock-up-solenoid 77, and due to this command value, a hydraulic condition of the lock-up-clutch 20 is indicated to control the condition of the lock-up-clutch 20 (step S100).

Figure 5:
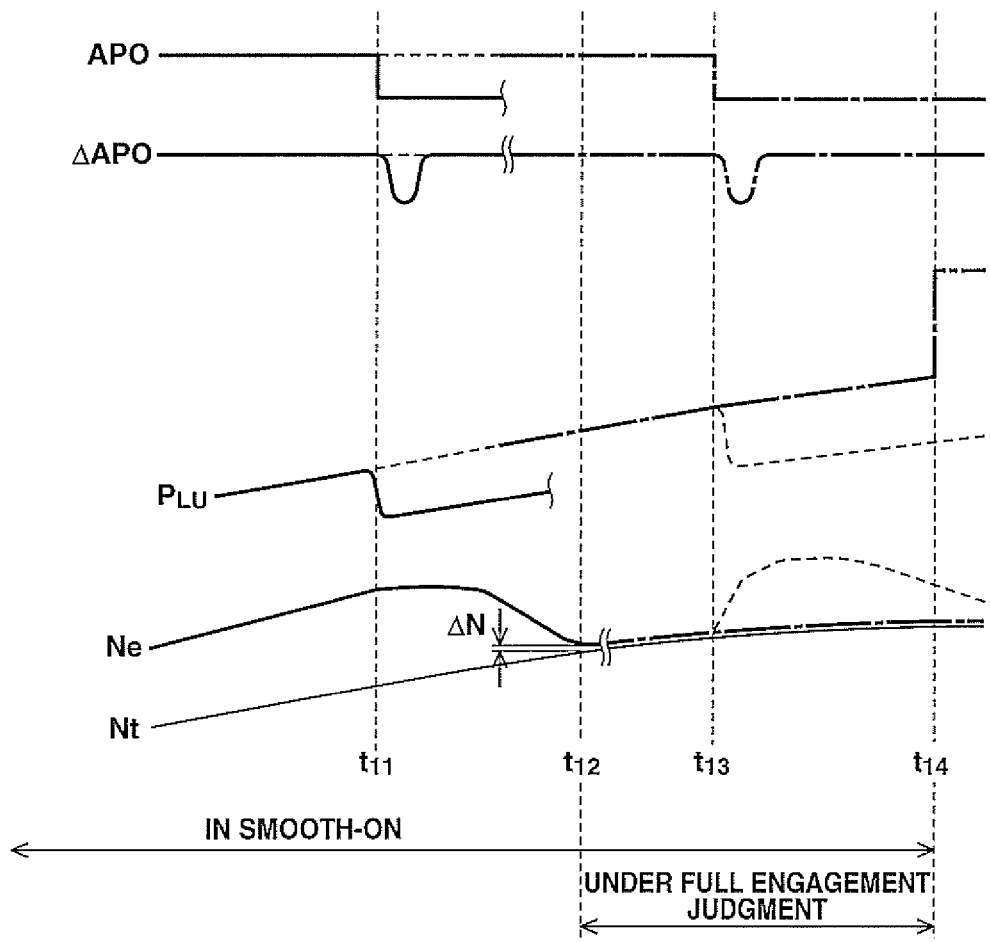
FIG. 5 is a time chart that shows the step-returning control of the accelerator which is carried out by the lock-up-clutch control device of the first embodiment of the present invention.

FIG. 5 is a time chart showing an example that employs a control in which when, during the engagement control of the lock-up-clutch 20, the accelerator open degree APO reduces, that is, when the engaging capacity $T_{LU}(n)$ for the accelerator open degree reduction time engaging capacity is used or adopted. As is seen from the solid lines in FIG. 5, when a step-returning action of the accelerator pedal (reduction of the accelerator open degree) takes place at the time point $t_{11}$, the engaging pressure $P_{LU}$ is reduced in accordance with a decreased level $\Delta APO$ of the accelerator open degree APO (which corresponds to a decreased level and decreased rate per each control period), and thus the rapid engagement of the lock-up-clutch 20 can be avoided.

That is, when the accelerator open degree APO so reduces, the output torque Te of the engine 1 is lowered, and thus the input torque Tcin applied to the torque converter 2 is reduced thereby to lower the engaging pressure $P_{LU}$ needed for fully engaging the lock-up-clutch 20. Thus, if the ramp control for increasing the engaging pressure $P_{LU}$ in a ramp state in accordance with the smooth-on control is maintained, the rotation speed difference (slip rotation speed) $\Delta N$ between the input and output elements of the torque converter 2 is rapidly reduced thereby to cause the rapid engagement of the lock-up-clutch 20 and undesired movement of the motor vehicle.

While, in the device according to the invention, the engaging pressure $P_{LU}$ is reduced upon occurrence of the step-returning action of the accelerator pedal, and thus, the rapid engagement of the lock-up-clutch 20 can be avoided. Particularly, since the hydraulic pressure is used for controlling the engaging pressure $P_{LU}$, reduction of the engaging pressure PLU suffers from a response delay (time lag) even when the command value for the engaging pressure $P_{LU}$ is changed. However, in the device of the invention, the reduction of the engaging pressure is not based on the reduction of the output torque Te of the engine 1, but based on the reduction of the accelerator open degree APO that serves as a trigger for reducing the output torque Te to reduce the input torque Tcin, and thus, changing of the command value for the engaging pressure PLU is carried out in an early stage, and thus, the influence by the response delay (time lag), viz., the undesired movement of the motor vehicle caused by the rapid engagement of the lock-up-clutch 20, can be avoided.

Furthermore, since the reduction amount (viz., reduction amount of the engaging capacity $T_{LU}$ of the lock-up-clutch 20) of the engaging pressure $P_{LU}$ is set in accordance with the size of the decreased level $\Delta APO$ of the accelerator open degree APO, it never occurs that the engaging pressure $P_{LU}$ is excessively lowered, and thus, engagement of the lock-up-clutch 20 is achieved without using an excessive time while avoiding the rapid engagement of the lock-up-clutch 20.

In the example denoted by the solid lines in FIG. 5, at the time $t_{11}$, the step-returning action of the accelerator pedal takes place and thereafter the accelerator pedal is kept at a constant level, and after the engaging pressure $P_{LU}$ is reduced due to the step-returning action of the accelerator pedal, the ramp control is continued for increasing the engaging pressure $P_{LU}$ in a ramp state in accordance with the smooth-on control. Due to this smooth-on control, the rotation speed difference (slip rotation speed) $\Delta N$ between the input and output elements of the torque converter 2 becomes smaller than the engagement judgment reference value $\Delta NO$ (for example, 10 rpm) at the time $t_{12}$, and at this time point, the smooth-on control is ended judging that the lock-up-clutch 20 has been fully engaged thereby to increase the engaging pressure $P_{LU}$ in a step state.

However, this judgment for the full engagement (viz., locked up condition) is carried out after filtering the calculated slip rotation speed $\Delta N$ for noise cancellation, and thus, after the slip rotation speed $\Delta N$ becomes equal to or lower than the engagement judgment reference value $\Delta N0$ (for example, 10 rpm), there is produced a small but certain time lag, so that during the period, the full engagement judgment is under operation, so that the sooth-on control is not ended. However, in this case, when the exactly calculated value of the slip rotation speed $\Delta N$ becomes equal to or smaller than the engagement judgment reference value $\Delta N0$, the reduction control for the engaging pressure $P_{LU}$ is inhibited.

When, with the slip rotation speed $\Delta N$ being equal to or smaller than the engagement judgment reference value $\Delta N0$, the engaging pressure $P_{LU}$ is lowered as is denoted by broken lines in FIG. 5, the engine rotation speed Ne is increased as is shown by the broken line in FIG. 5 thereby increasing the slip rotation speed $\Delta N$ again. Thus, the torque converter 2 is forced to take an unstable condition between the slip condition and the lock-up condition, which tends to produce judder (abnormal vibration). Inhibiting the reduction control of the engaging pressure $P_{LU}$ is aimed to avoid such judder appearance. Accordingly, even when, with the full engagement judgment being under operation, the step-returning action of the accelerator pedal takes place at the time t13 as is denoted by the dot-dash line in FIG. 5, the engaging pressure $P_{LU}$ is not reduced thereby causing the ramp-state increase of the engaging pressure $P_{LU}$ by the smooth-on control to be continued, and thus production of judder is avoided.

Figure 6:
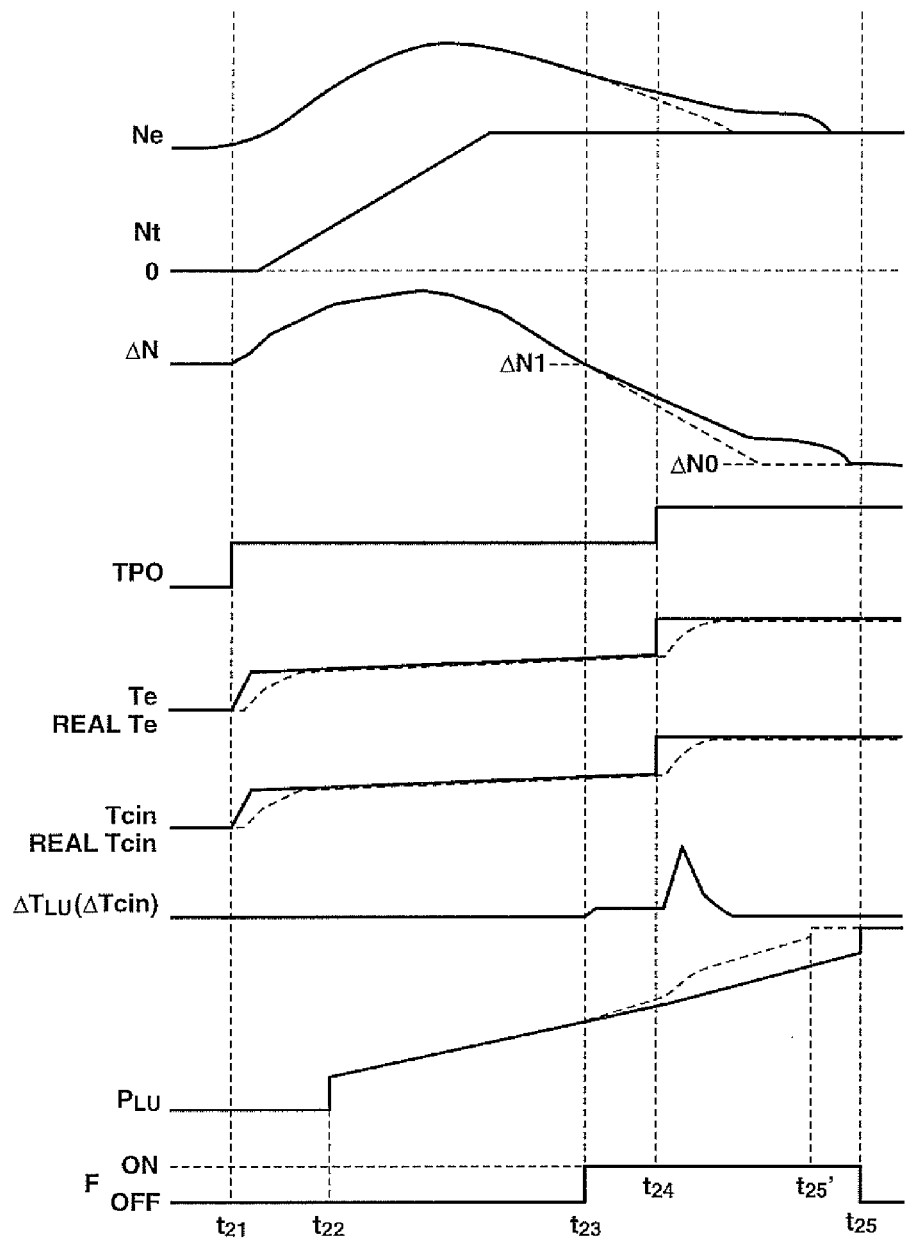
FIG. 6 is a time chart that shows an input torque increasing control (part-1) which is carried out by the lock-up-clutch control device of the first embodiment of the present invention.

FIG. 6 is a time chart showing an example that employs a control in which when, during the engagement control of the lock-up-clutch 20, the accelerator open degree APO is not reduced and the engine output torque Te is increased due to the step-increasing action of the accelerator pedal, that is, when the engaging capacity $T_{LU}(n)$ for the torque increase time engaging capacity is used or adopted. In FIG. 6, the engine rotation speed Ne and the turbine rotation speed Nt are shown on the same reference axis (rotation speed 0). Denoted by F in FIG. 6 is a flag that is raised (F=1) when, due to increase of the input torque Tcin inputted to the torque converter that is taking the slip condition, it is necessary to make an increase correction to the engaging pressure $P_{LU}$ (viz., in case of adopting the torque increase time engaging capacity). Here, when the slip rotation speed $\Delta N$ becomes equal to or lower than the first predetermined value $\Delta N1$ (time $t_{23}$), switching is made to a control mode (F=1) where the engaging pressure $P_{LU}$ is subjected to the increase correction, while, when the slip rotation speed $\Delta N$ becomes equal to or smaller than the engagement judgment reference value $\Delta N0$ (time $t_{25}$), this control mode is finished (F=0).

As is seen from FIG. 6, when, with the motor vehicle being at standstill, a step-depression of the accelerator pedal takes place at the time $t_{21}$ to cause a raising of the throttle open degree TPO, the engagement control for the lock-upclutch 20 is started. At the time $t_{22}$ thereafter, the engaging pressure $P_{LU}$ that is the command value for the engaging pressure of the lock-up-clutch 20 is raised up, and the engaging pressure $P_{LU}$ is gradually increased. Thereafter, at the time $t_{23}$, the slip rotation speed ΔN becomes equal to or smaller than the first predetermined value ΔN1, and switching is made to the control mode (F=1) where the engaging pressure $P_{LU}$ is corrected.

When the control is switched to the control mode for correcting the engaging pressure $P_{LU}$, the engaging capacity change amount $\Delta T_{LU}$ (ΔTcin) for correction appears against the increase of the engine torque Te, and in accordance with the addition of this engaging capacity change amount $\Delta T_{LU}$ (ΔTcin), the engaging pressure $P_{LU}$ is subjected to a riding increase as is denoted by the broken line. Since the accelerator open degree is slightly increased just after the time $t_{23}$, the riding correction of the engaging pressure $P_{LU}$ is small. However, due to this riding correction of the engaging pressure $P_{LU}$, lowering of the slip rotation speed ΔN is promoted as is denoted by the broken line, and thus, shifting of the lock-up-clutch 20 to the lock-up condition is advanced.

Thereafter, at the time $t_{24}$, due to a step-increase action of the accelerator pedal, an stepped increase of the throttle open degree takes place, and in response to this stepped increase, the engine torque Te is rapidly increased and thus the input torque Tcin inputted to the torque converter 2 is rapidly increased by an amount corresponding to the increased part of the engine torque. In this time, the engaging capacity change amount $\Delta T_{LU}$ (ΔTcin) for correction is increased also, and the engaging pressure $P_{LU}$ is increased in accordance with the increase of the engaging capacity change amount $\Delta T_{LU}$ (ΔTcin), as is denoted by the broken line.

However, in this case, when the engine torque Te is estimated by the calculation, the torque value based on the throttle open degree and the engine rotation speed Ne is calculated by taking waste time and time constant into consideration, and thus, the engine torque Te thus estimated is brought to a value near an actual value (actual Te) having its increasing dulled as is denoted by the broken line, and the input torque Tcin is brought to a value near an actual value (actual Tcin) also. Accordingly, also the engaging capacity change amount $\Delta T_{LU}$ (ΔTcin) is increased with an inclination and also the engaging pressure $P_{LU}$ is increased with an inclination.

As is described hereinabove, since the engaging pressure $P_{LU}$ is increased together with the engaging capacity change amount $\Delta T_{LU}$ (ΔTcin) being increased in accordance with the increase of the input torque Tcin inputted to the torque converter 2, the engine rotation speed Ne is reduced speedily as is denoted by the broken line as compared with a case where no control is employed (solid line), and the slip rotation speed ΔN is brought to 0 (zero) speedily and stably as is denoted by the broken line as compared with the case where no control is employed (solid line), and the lock-up judgment is speedily carried out (time $t_{25'}$) as compared with that of the lock-up judgment timing (time $t_{25}$) where, as is denoted by the solid line, no control is employed.

Of course, the lock-up-clutch 20 is engaged speedily in such a manner as not to produce an engagement shock. Although judder (abnormal vibration) tends to take place when the lock-up-clutch 20 is in a border between the slip condition and the lock-up condition, the stable reduction in the slip rotation speed ΔN can avoid occurrence of the judder.

That is, if the input torque Tcin is increased, the engaging pressure $P_{LU}$ needed for engaging the lock-up-clutch 20 (lock-up) is increased too, and thus, in the smooth-on control where the increase amount is constant (only $\Delta T_{LU}$), not only the engagement of the lock-up-clutch 20 takes time, but also the lock-up-clutch 20 becomes unstable in the border between the slip condition and the lock-up condition, and thus, judder tends to occur. However, in the invention, the increase correction is applied to the engaging pressure $P_{LU}$ with reference to the engaging capacity change amount $\Delta T_{LU}$(ΔTcin) that is varied according to increase of the input torque Tcin, and thus, occurrence of judder can be avoided and the lock-up-clutch 20 can be engaged quickly (time $t_{25'}$).

Figure 7:
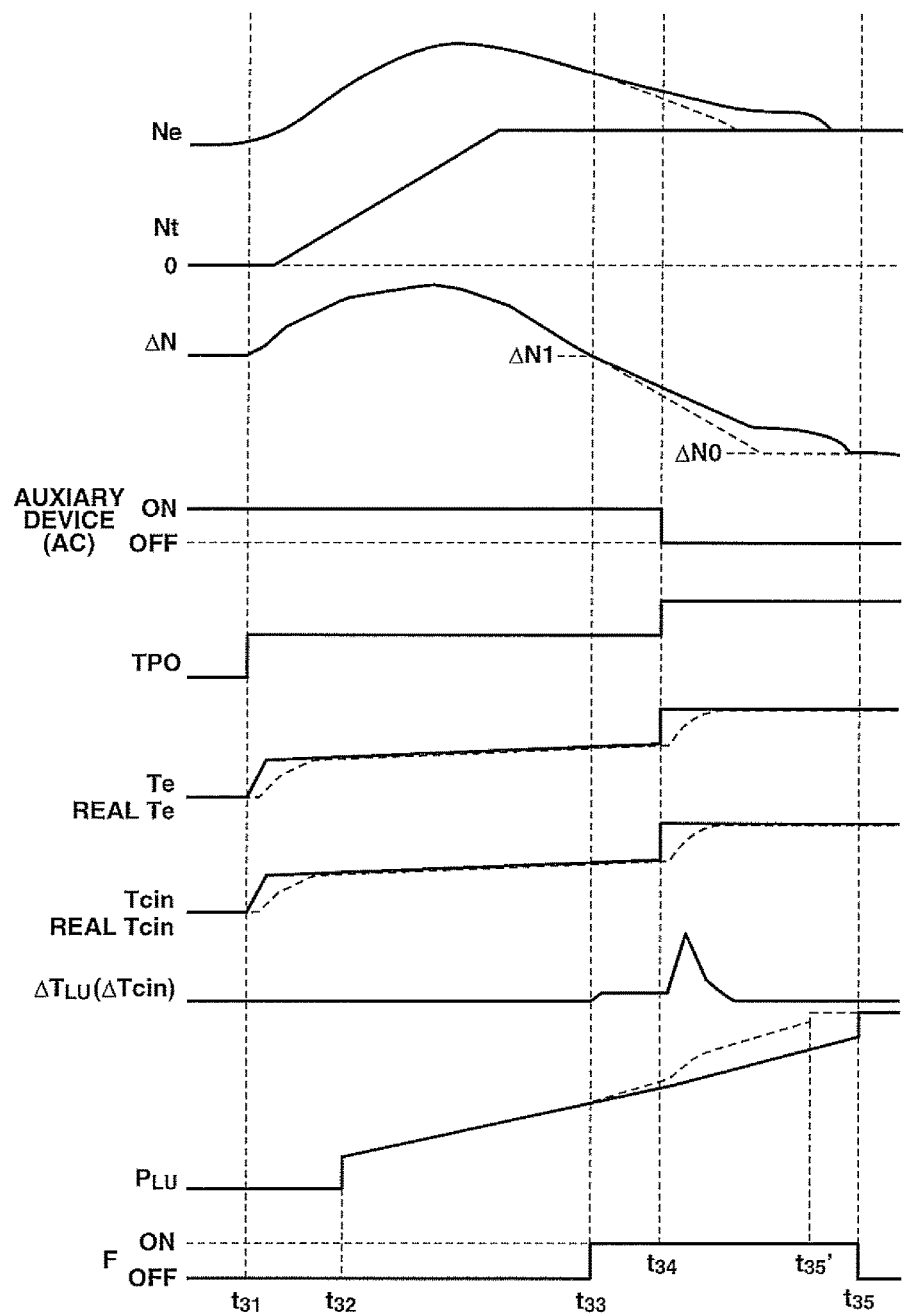
FIG. 7 is a time chart that shows an input torque increasing control (part-2) which is carried out by the lock-up-clutch control device of the first embodiment of the present invention.

In the example shown in FIG. 6, a case is supposed in which the input torque Tcin inputted to the torque converter 2 is increased when the engine output torque Te per se is increased and the operation condition of the auxiliary device 110 driven by the engine is not affected by the increase of the engine output torque. While, in case where the auxiliary device 110 driven by the engine is shifted from the operation condition to the stopped condition even when the engine output torque Te per se is not increased, the input torque Tcin inputted to the torque converter 2 is increased. FIG. 7 is a time chart that depicts such case.

As is indicated in FIG. 7, at the time t31, the throttle open degree TPO is raised upon depression of the accelerator pedal, and the engaging control for the lock-up-clutch 20 is started. Thereafter, at the time $t_{32}$, the lock-up-clutch 20 is shifted to the slip condition causing a raise of the engaging pressure $P_{LU}$, and the engaging pressure $P_{LU}$ is gradually increased. Thereafter, at the time $t_{33}$, the slip rotation speed ΔN becomes equal to or smaller than the first predetermined value ΔN1 switching the mode to the control mode (F=1) for correcting the engaging pressure $P_{LU}$.

When the mode is shifted to the control mode to control the engaging pressure $P_{LU}$, the engaging capacity change amount $\Delta T_{LU}$ (ΔTcin) for correction is calculated relative to the increase of the engine torque Te, and as is denoted by the broken line, the engaging pressure $P_{LU}$ is subjected to a riding increase in accordance with an addition correction of the engaging capacity change amount $\Delta T_{LU}$ (ΔTcin). Since the accelerator open degree is slightly increased just after the time t33, the riding correction of the engaging pressure $P_{LU}$, which is however small, accelerates the reduction of the slip rotation speed ΔN as is denoted by the broken line, so that the shifting of the lock-up-clutch 20 to the lock-up condition is sped up. These actions are the same as those of the example of FIG. 6.

The following will be started assuming that, at the time $t_{34}$ thereafter, the auxiliary device (here, a compressor of an air conditioner) 110 changes its condition from the operation condition to the stopped condition. When the auxiliary device 110 driven by the engine changes the condition from the operation to the stopped condition, the part of the engine torque Te that is consumed by the auxiliary device 110 is fed to the torque converter 2, and thus, the input torque Tcin fed to the torque converter 2 is rapidly increased. Upon this, the engaging capacity change amount $\Delta T_{LU}$ (ΔTcin) for correction is also increased, and thus, the engaging pressure PLU is also increased in accordance with increase of the engaging capacity change amount $\Delta T_{LU}$ (ΔTcin) as is denoted by the broken line.

As is described hereinabove, in accordance with the increase of input torque Tcin inputted to the torque converter 2, the engaging capacity change amount $\Delta T_{LU}$ (ΔTcin) is also increased and the engaging pressure $P_{LU}$ is increased, and thus, as is denoted by the broken line, the engine rotation speed Ne is speedily lowered as compared with a case where no control is carried out (solid line), and as is denoted by the broken line, the slip rotation speed ΔN is speedily brought to a stable 0 (zero) focused state as compared with a case where no control is carried out (solid line), and thus, the lock-up judgment is completed quickly (the time $t_{35'}$) as compared with a case denoted by the solid line where the lock-up judgment is carried out under non-control condition (the time $t_{35}$).

Of course, the lock-up-clutch 20 is speedily engaged in such a manner as not to produce the engaging shock. Although when the lock-up-clutch 20 is in a border condition between the slip condition and the lock-up condition, judder (abnormal vibration) tends to occur, the stable lowering of the slip rotation speed ΔN can eliminate occurrence of such undesired judder.

That is, when, due to shifting of the auxiliary device 110 from the operation condition to the stopped condition, the input torque Tcin is increased, the engaging pressure $P_{LU}$ needed for engagement (lock-up) of the lock-up-clutch 20 is also increased, and thus, in the smooth-on control where the increase amount is constant (only $\Delta T_{LU}$), establishing the engagement of the lock-up-clutch 20 takes time, but by correcting the engaging capacity change amount $\Delta T_{LU}$ (ΔTcin) in accordance with increase of the input torque Tcin, occurrence of judder can be avoided and the lock-up-clutch 20 can be speedily brought into the engaged condition (the time $t_{35'}$).

Since a main control of the smooth-on control can be completed within a given time, it is effective to prohibit ON/OFF operation of the auxiliary device 110 during the operation of the main control for the purpose of eliminating the influence by the ON/OFF operation of the auxiliary device 110. In view of fuel saving, it is desirable to speedily effect the switching from the operation condition to the stopped condition without delay during the ON/OFF operation of the auxiliary device 110. Thus, in the main control, the switching is reflected to the control without prohibiting the switching from the operation condition to the stopped condition in the ON/OFF operation of the auxiliary device 110 during the operation of the control, so that the influence by the ON/OFF operation of the auxiliary device 110 to the engaging control of the lock-up-clutch 20 is suppressed. While, since the switching of the auxiliary device 110 from the stopped condition to the operation condition does not bring about deterioration of fuel consumption, the influence by the ON/OFF operation of the auxiliary device 110 can be suppressed by prohibiting the switching.

In FIGS. 6 and 7, graphical representation and written explanation regarding the switching from the ramp-2 to the ramp-1 made in FIG. 2 are not provided and explanation is made assuming that previously set ramps are constant ones.

Other Embodiments

In the above, an embodiment of the present invention is described. However, the present invention is not limited to the above-mentioned embodiment. That is, various modifications and variations of such embodiment and employment of one part of the embodiment may be carried out without deviating the substance of the present invention.

In the above-mentioned embodiment, as the input torque increase control, the example (FIG. 6) caused by increase of the output torque Te of the engine 1 per se and the example (FIG. 7) caused by the switching from ON to OFF of the auxiliary device 110 are explained. The input torque Tcin is calculated from the output torque Te and the operation condition of the auxiliary device 110, and thus, if the increase of the output torque Te and the switching of the auxiliary device 110 take place at the same time, both of them are reflected to the engaging capacity change amount $\Delta T_{LU}$ (ΔTcin) for correction.

In the above-mentioned embodiment, a case for increasing the input torque Tcin by switching the auxiliary device 110 from ON to OFF is explained as a representative example for reducing the output torque (load of auxiliary device) that is applied to the auxiliary device 110 from the engine 1. However, when, with the auxiliary device 110 being in ON condition, the switching is carried out from a high output operation condition to a low output operation condition, the output torque (load of auxiliary device) that is applied to the auxiliary device 110 from the engine 1 is reduced thereby to increase the input torque Tcin, and thus, also in this case, the input torque increase control is applicable.

In the above-mentioned embodiment, establishing that the differential rotation speed ΔN becomes equal to or lower than the first predetermined value ΔN1 is achieved by matching the condition for starting the main control with the condition where switching from the ramp-2 to the ramp-1 is carried out in the ramp control, which is simple in construction. However, it is not always necessary to match these conditions.

Furthermore, in the above-mentioned embodiment, when the accelerator open degree is reduced, a control for reducing the engaging capacity of the lock-up-clutch based on the reduced part of the accelerator open degree is carried out while taking priority over other controls, and thus, rapid engagement of the lock-up-clutch 20 is avoided and thus undesired movement of the motor vehicle caused by such rapid engagement is avoided. However, by employing a control by which the engaging capacity of the lock-up-clutch 20 is carried out by treating the input torque Tcin to the torque converter 2 by taking reduction of the load of the auxiliary device into consideration without usage of the control based on the reduction of the accelerator open degree, an effect for assuredly avoiding an undesirable pressure shortage that would be induced in the period toward the lock-up condition is obtained.

The invention claimed is:

1. A control device for a lock-up-clutch installed in a torque converter arranged between a prime mover serving as a driving source and an automatic transmission mechanism, the control device including an engagement control means that carries out a calculation to increase an engaging capacity of the lock-up-clutch with the passage of time during an engagement control time in which the torque converter is shifted from a converter condition to a lock-up condition, the prime mover driving an auxiliary device,
   in which:
     when, during the control to increase the engaging capacity of the lock-up-clutch, an input torque inputted to the torque converter from the prime mover is increased due to reduction in load of the auxiliary device, the engagement control means promotes the increase of the engaging capacity of the lock-up-clutch based on the amount of increase of the input torque.

2. A control device for a lock-up-clutch as claimed in claim 1, further comprising:
   an input torque estimation means that estimates the input torque inputted to the torque converter from the prime mover;
   a torque increase judgment means that judges whether the input torque thus estimated by the input torque estimation means is increased or not; and an engaging capacity calculation means that calculates a command value for the engaging capacity of the lock-up-clutch at a predetermined calculation period, in which the engaging capacity calculation means includes a first calculation portion that calculates a current command value by adding a predetermined change amount to a previous command value so as to increase the engaging capacity of the lock-up-clutch with the passage of time and a second calculation portion that calculates, when increase of the input torque is judged by the torque increase judgment means, the current command value by adding, to the previous command value, both the predetermined change amount and a change amount based on the amount of increase of the input torque; and in which when increase of the input torque is judged based on a judgment result by the torque increase judgment means, the engagement control means controls the engaging capacity of the lock-up-clutch based on the current command value calculated by the second calculation portion, and when no increase of the input torque is judged based on the judgment result, the engagement control means controls the engaging capacity of the lock-up-clutch based on the current command value calculated by the first calculation portion.

3. A control device for a lock-up-clutch as claimed in claim 2, further comprising:

an accelerator open degree detecting means that detects an accelerator open degree of the motor vehicle; and an open degree reduction judgment means that judges whether the accelerator open degree detected by the accelerator open degree detecting means is decreased or not, in which the engaging capacity calculation means further includes a third calculation portion that, when reduction of the accelerator open degree is judged by the open degree reduction judgment means, calculates the current command value by subtracting a predetermined change amount from the previous command value; and in which when no reduction of the accelerator open degree is judged and no increase of the input torque is judged, the engagement control means controls the engaging capacity of the lock-up-clutch based on the current command value calculated by the first calculation portion, when no reduction of the accelerator open degree is judged and increase of the input torque is judged, the engagement control means controls the engaging capacity of the lock-up-clutch based on the current command value calculated by the second calculation portion and when reduction of the accelerator open degree is judged, the engagement control means controls the engaging capacity of the lock-up-clutch based on current command value calculated by the third calculation portion.

4. A control device for a lock-up-clutch as claimed in claim 2, in which the input torque estimation means estimates the input torque from the output torque of the prime mover and an auxiliary device drive torque applied from the prime mover to the auxiliary device.

5. A control device for a lock-up-clutch as claimed in claim 1, in which the auxiliary device includes a compressor employed in an air conditioner.

6. A control device for a lock-up-clutch installed in a torque converter arranged between a prime mover serving as a driving source and an automatic transmission mechanism, the control device including an engaging capacity calculation means that carries out a calculation to increase an engaging capacity of the lock-up-clutch with the passage of time during an engagement control time in which the torque converter is shifted from a converter condition to a lock-up condition and an engagement control means that controls the engaging pressure of the lock-up-clutch based on the engaging capacity thus calculated, in which the control device further includes:

an accelerator open degree detecting means that detects an accelerator open degree of the motor vehicle;

an open degree reduction judgment means that judges whether the accelerator open degree detected by the accelerator is decreased or not;

an input torque estimation means that estimates the input torque inputted to the torque converter from the prime mover; and a torque increase judgment means that judges whether the input torque thus estimated is increased or not, in which when reduction of the accelerator open degree is judged, the engaging capacity calculation means reduces the engaging capacity of the lock-up-clutch based on an amount of reduction of the open degree, and when no reduction of the accelerator open degree is judged and increase of the input torque is judged, the engaging capacity calculation means promotes the increase of the engaging capacity of the lock-up-clutch.

* * * * *